(12) United States Patent
Jung (10) Patent No.: US 11,271,232 B2
(45) Date of Patent: Mar. 8, 2022

(54) METHOD FOR CONTROLLING OUTPUT OF FUEL CELL STACK

(71) Applicants: Hyundai Motor Company, Seoul (KR); Kia Motors Corporation, Seoul (KR)

(72) Inventor: Jae Won Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 101 days.

(21) Appl. No.: 16/802,075

(22) Filed: Feb. 26, 2020

(65) Prior Publication Data

US 2021/0028469 A1   Jan. 28, 2021

(30) Foreign Application Priority Data

Jul. 25, 2019 (KR) .......................... 10-2019-0090078

(51) Int. Cl.
*H01M 8/04* (2016.01)
*B60L 58/30* (2019.01)
*H01M 8/04858* (2016.01)

(52) U.S. Cl.
CPC .......... *H01M 8/0491* (2013.01); *B60L 58/30* (2019.02); *H01M 8/0488* (2013.01); *H01M 8/0494* (2013.01); *H01M 2250/20* (2013.01)

(58) Field of Classification Search
CPC ............. H01M 8/0488; H01M 8/0491; H01M 8/0494; H01M 8/249; H01M 2250/20; B60L 58/30; Y02E 60/50; Y02T 90/40
See application file for complete search history.

(56) References Cited

U.S. PATENT DOCUMENTS

2015/0099204 A1*   4/2015   O'Neill ............... H01M 8/0494
429/431

FOREIGN PATENT DOCUMENTS

JP          2012-160336      *  8/2012

OTHER PUBLICATIONS

English translation of JP Publication 2012-160336, Aug. 2012.*

* cited by examiner

*Primary Examiner* — Brittany L Raymond
(74) *Attorney, Agent, or Firm* — Mintz Levin Cohn Ferris Glovsky and Popeo, P.C.; Peter F. Corless (57) ABSTRACT

A method for controlling an output of a fuel cell stack is provided. The method includes calculating a total requirement current value to be output from a plurality of fuel cell stacks in a fuel cell electric vehicle (FCEV) including the plurality of fuel cell stacks. The calculated total requirement current value is then allocated to each fuel cell stack based on a voltage of the fuel cell stack.

9 Claims, 6 Drawing Sheets

METHOD FOR CONTROLLING OUTPUT OF FUEL CELL STACK

CROSS-REFERENCE TO RELATED APPLICATION

This application claims the benefit of priority to Korean Patent Application No. 10-2019-0090078, filed on Jul. 25, 2019, the entire contents of which are incorporated herein by reference.

TECHNICAL FIELD

The present disclosure relates to a technology of efficiently controlling an output of each of a plurality of fuel cell stacks, in a fuel cell electric vehicle (FCEV) having the plurality of fuel cell stacks.

BACKGROUND

A fuel cell is a type of power generation device that converts chemical energy of a fuel into electric energy through electrochemical reaction in a stack instead of converting the chemical energy into heat by combustion. The fuel cell may be applied to the power supply of small-sized electrical/electronic products, especially, portable devices. Recently, research has been conducted regarding a fuel cell in the form of polymer electrolyte membrane fuel cell (Proton Exchange Membrane Fuel Cell; PEMC) having the highest power density among fuel cells due to rapid start-up time and rapid power conversion response time due to low operating temperature.

The PEMC includes a membrane electrode assembly (MEA) having catalytic electrode layers attached to opposite sides thereof to generate electrochemical reaction based on a lid polymer electrolyte membrane in which hydrogen ions move, a gas diffusion layer (GDL) to uniformly distribute reaction gas and to transmit electrical energy, which is generated, a gasket and a coupling mechanism to maintain proper airtightness and a proper coupling pressure of reaction gases and cooling water, and a bipolar plate to move the reaction gases and the cooling water.

When assembling a fuel cell stack using such a unit cell structure, a combination of the MEA and the GDL, which are main components, are positioned at the innermost part of the cell. The MEA has a stack structure of catalyst electrode layers, that is, an anode and a cathode, formed by applying catalysts to opposite surfaces of a polymer electrolyte membrane such that hydrogen and oxygen make a reaction, and the GDL and the gasket formed outside the anode and the cathode. The GDL is formed at the outer portion thereof with a separation plate having a flow field to supply the reaction gas (e.g., hydrogen serving as fuel and oxygen or air serving as oxidant) and to pass the cooling water.

A plurality of unit cells, each of which has the above configuration, are stacked and a current collector and an insulating plate, and an end plate to support the stacked cells are assembled with the outer most portion of the stack structure. The unit cells are repeatedly stacked between the end plates, thereby forming a fuel cell stack. To obtain the potential necessary for a vehicle, unit cells have to be stacked corresponding to the necessary potential, and the structure obtained by stacking the unit cells is a stack. The potential generated from one unit cell is about 1.3 V, and a plurality of cells are stacked in series to produce power necessary to drive a vehicle.

Recently, large vehicle models (e.g., buses, trucks, etc.) that stably require high output are equipped with a fuel cell system in which a plurality of fuel cell stacks are connected in parallel. The fuel cell stacks represent the performance difference therebetween due to the structure, and represent the difference therebetween in durability deterioration, or performance deterioration, thereby generating the voltage difference therebetween. According to a conventional technology of adjusting the output of each fuel cell stack in the FCEV having a plurality of fuel cell stacks, a lower current is required in the fuel cell stack having a higher voltage, and a higher current is required in the fuel cell stack having a lower voltage. Accordingly, the deterioration of the fuel cell stack having the lower voltage is accelerated and the output performance of the fuel cell system may be deteriorated.

Matters described in this section are made to promote an understanding of the background of the present disclosure, it may include matters other than the related art already known to those skilled in the art.

SUMMARY

The present disclosure provides a method for controlling output of a fuel cell stack that prevents the difference in performance between fuel cell stacks by effectively adjusting the output of a plurality of fuel cell stacks in a fuel cell electric vehicle (FCEV) having the plurality of fuel cell stacks.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a method for controlling an output of a fuel cell stack may include calculating a total requirement current value to be output from a plurality of fuel cell stacks in a fuel cell electric vehicle (FCEV) including the plurality of fuel cell stacks, and allocating the calculated total requirement current value to each fuel cell stack based on a voltage of each fuel cell stack. In particular, the allocating of the calculated total requirement current value to each fuel cell stack may include calculating an allocation ratio of the total requirement current value to be applied to each fuel cell stack, and allocating a requirement current value, which corresponds to the calculated allocation ratio, to each fuel cell stack.

In addition, the calculating of the allocation ratio of the total requirement current value may include calculating the allocation ratio of the total requirement current value to minimize a difference between voltages of each fuel cell stack. The calculating of the allocation ratio of the total requirement current value may be performed periodically.

The allocating of the requirement current may include allocating a smaller value of a requirement current value, to which an allocation ratio calculated at a previous time point is applied, and a maximum available current value, to at least one fuel cell stack of the plurality of fuel cell stacks, when the requirement current value applied to a corresponding fuel cell stack exceeds the maximum available current value of the corresponding fuel cell stack. In addition, the allocating of the calculated total requirement current value may be performed when an output current value of each fuel cell stack exceeds a reference value.

According to another aspect of the present disclosure, a method for controlling an output of a fuel cell stack may include calculating a total requirement current value required in a fuel cell electric vehicle (FCEV) including a first fuel cell stack and a second fuel cell stack, calculating an allocation ratio of the total requirement current value to minimize a difference between a voltage of the first fuel cell stack and a voltage of the second fuel cell stack, and allocating a requirement current value to each of the first fuel cell stack and the second fuel cell stack based on the calculated allocation ratio.

In particular, the allocating of the requirement current value may include allocating a higher requirement current value to the first fuel cell stack higher than the second fuel cell stack in voltage, and allocating a lower requirement current value to the second fuel cell stack lower than the first fuel cell stack in voltage. In addition, the calculating of the allocation ratio of the total requirement current value may be performed periodically.

The allocating of the requirement current value may further include allocating a smaller value of a requirement current value, to which an allocation ratio calculated at a previous time point is applied, and a maximum available current value of each of the first fuel cell stack and the second cell stack, to a corresponding fuel cell stack, when the requirement current value applied to the corresponding fuel cell stack exceeds the maximum available current value of the corresponding fuel cell stack. In addition, the allocating of the requirement current value may be performed, when all an output current value of the first fuel cell stack and an output current value of the second fuel cell stack exceed a reference value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined in the present application.

Figure 1:
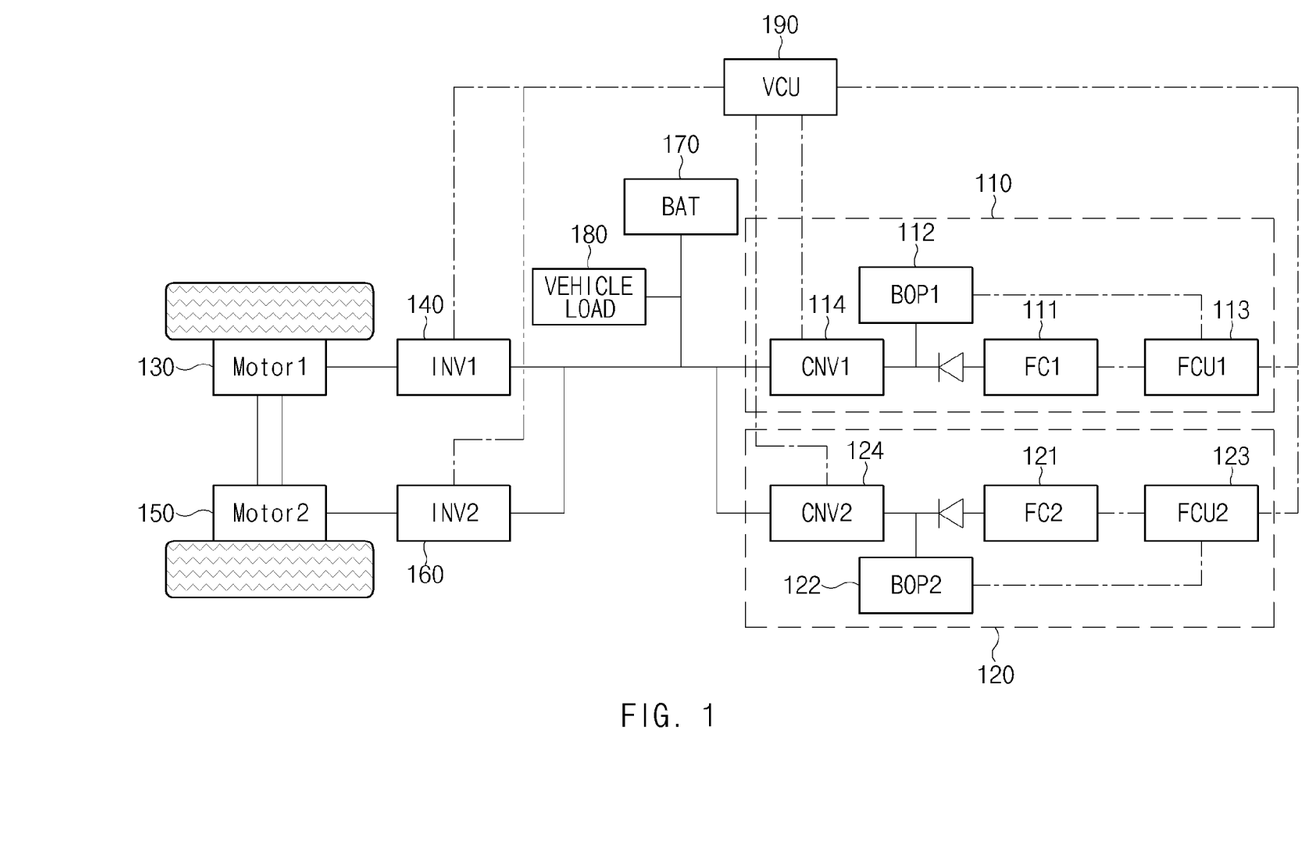
FIG. 1 is a block diagram illustrating a fuel cell vehicle, according to an exemplary embodiment of the present disclosure.

FIG. 1 is a block diagram illustrating a fuel cell vehicle, according to an exemplary embodiment of the present disclosure. As illustrated in FIG. 1, according to an exemplary embodiment of the present disclosure, a fuel cell electric vehicle (FCEV) may include a first fuel cell system 110, a second fuel cell system 120, a first motor (Motor 1) 130, a first motor controller (INV1) 140, a second motor (Motor 2) 150, a second motor controller (INV2) 160, a high voltage battery (BAT) 170, a vehicle load 180, and a vehicle controller (VCU) 190. The VCU may be configured to operate the other components of the system.

Regarding each of the components, the first fuel cell system 110 may be configured to provide driving power to the FCEV and may include a fuel cell stack 111 to produce electric energy using hydrogen and oxygen, a first auxiliary part (BOP1) 112 to assist the operation of the first fuel cell stack 111, a fuel cell controller (FCU1) 113 configured to operate the first fuel cell stack 111, and a first direct current-direct current (DC-DC) converter (CNV1) 114 to adjust the output of the first fuel cell stack 111.

The second fuel cell system 120 may be configured to provide driving power to the FCEV and may include a second fuel cell stack 121 to produce electric energy using hydrogen and oxygen, a second auxiliary part (BOP2) 122 to assist the operation of the fuel cell stack 121, a fuel cell controller (FCU2) 123 configured to operate the second fuel cell stack 121, and a second DC-DC converter (CNV2) 124 to adjust the output of the second fuel cell stack 121.

The first motor 130 may be configured to drive the left wheel of the FCEV. In particular, the first motor controller 140 may be configured to operate the first motor 130. The second motor 150 may be configured to drive a right wheel of the FCEV. In particular, the second motor controller 160 may be configured to operate the second motor 150. The high voltage battery 170 may be configured to supply power at initial driving of the fuel cell or charge the generated power of the fuel cell, and may be configured to store the regenerative braking energy of the first motor 130 and the second motor 150.

The vehicle load 180, which is an electrical device (e.g., air conditioner, heating, etc.) mounted within the FCEV, may be connected to the high voltage battery 170. The vehicle controller 190, which is an upper controller configured to operate the FCEV may be configured to operate the first DC-DC converter 114 and the fuel cell controller (FCU1) 113 to adjust the output of the first fuel cell stack 111, and the second DC-DC converter 124 and the fuel cell controller 123 to adjust the output of the second fuel cell stack 121, as well as the first motor controller 140 and the second motor controller 160.

According to an exemplary embodiment of the present disclosure, a method for controlling the output of the fuel cell stack may be performed by the vehicle controller 190. The vehicle controller 190 may include a memory (not illustrated) having various logic, algorithms, and programs required to control the output of the fuel cell stack.

The storage 120 may be implemented with at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, and an optical disk type memory.

The vehicle controller 190 may be configured to execute the overall control to operate the components to perform the intrinsic functions thereof. In addition, the vehicle controller 190 may be implemented in the form of hardware or software, and may be present in the form of the combination of the hardware and the software and specifically programmed to execute the method described herein. The vehicle controller 190 may be implemented in the form of a micro-processor, but the present disclosure is not limited thereto.

The vehicle controller 190 may be configured to calculate the total required output by combining the consumption output, the regenerative braking output, and the various load outputs of the respective motors 130 and 150. In other words, the vehicle controller 190 may be configured to calculate the total requirement current value (current quantity) to be output by each of the fuel cell stacks 111 and 121. The vehicle controller 190 covers an amount other than the output capable of being supplied by the high voltage battery 170 through the fuel cell systems 110 and 120. Particularly, the current values (current quantities), which the vehicle controller 190 requires the FCUs 113 and 123 to provide, do not exceed the maximum available current values (current quantities) expected by the FCUs 113 and 123. The vehicle controller 190 may be configured to receive current voltage values, current values, and maximum available current values from the FCUs 113 and 123.

Hereinafter, a method for adjusting, by the vehicle controller 190, the output of the fuel cell stack 111 and the output of the second fuel cell stack 121 will be described in detail, with reference to FIGS. 2, 3A, and 3B. Particularly, the vehicle controller 190 may be configured to adjust the outputs of the fuel cell stacks 111 and 121 when the first fuel cell stack 111 and the second fuel cell stack 121 normally generate power and each of the fuel cell stacks 111 and 121 outputs the minimum current value or more.

Figure 2:
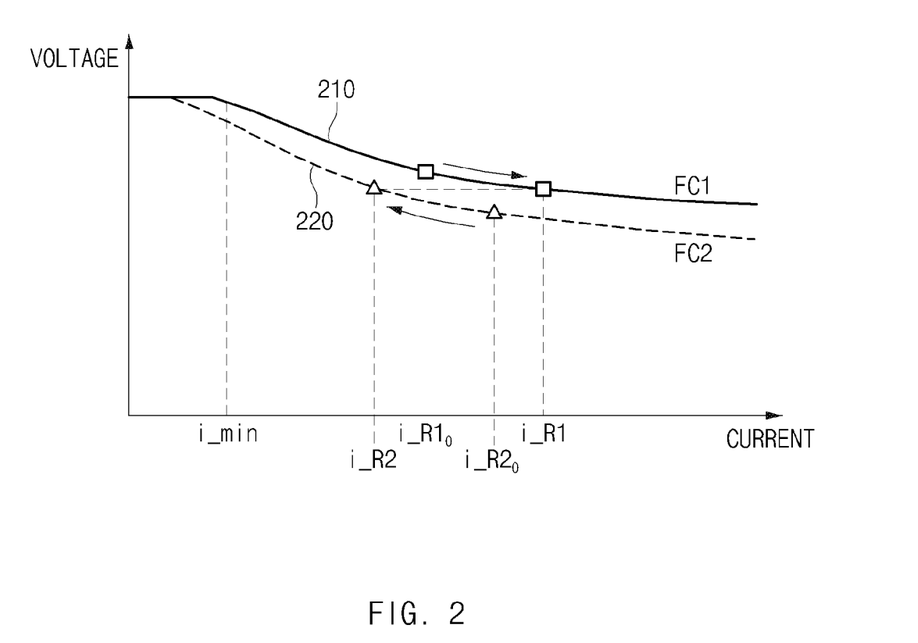
FIG. 2 is a graph illustrating voltages of a first fuel cell stack and a second fuel cell stack, according to an exemplary embodiment of the present disclosure.

FIG. 2 is a graph illustrating a voltage curve 210 of the first fuel cell stack (FC1) 111 and a voltage curve 220 of the second fuel cell stack (FC2) 121, according to an exemplary embodiment of the present disclosure. As illustrated in FIG. 2, the difference between the voltage of the first fuel cell stack (FC1) 111 and the voltage of the second fuel cell stack (FC2) 121 may be caused based on a performance difference and durability deterioration, or a difference in performance deterioration.

In FIG. 2, $i\_R1_0$ denotes an initial requirement current value for the first fuel cell stack (FC1) 111, and $i\_R2_0$ denotes an initial requirement current value for the second fuel cell stack (FC2) 121. In particular, $i\_R1_0$ and $i\_R2_0$ may be expressed as in following Equation 1 by way of example. The total requirement current value is the sum of $i\_R1_0$ and $i\_R2_0$.

$$i\_R1_0 = 0.5 \times \frac{P_{fc}}{V1} \qquad \text{Equation 1}$$
$$i\_R2_0 = 0.5 \times \frac{P_{fc}}{V2}$$

wherein, 0.5 denotes the initial requirement ratio, V1 denotes the voltage of the first fuel cell stack (FC1) 111, V2 denotes the voltage of the second fuel cell stack (FC2) 121, and $P_{fc}$ denotes the required power of the FCEV, respectively.

In addition, i_R1 denotes a requirement current value from the first fuel cell stack (FC1) 111 based on the voltage difference between the first fuel cell stack (FC1) 111 and the second fuel cell stack (FC2) 121, and i_R2 denotes a requirement current value from the second fuel cell stack (FC2) 121 based on the voltage difference between the first fuel cell stack (FC1) 111 and the second fuel cell stack (FC2) 121. In particular, i_R1 and i_R2 may be expressed as in following Equation 2 by way of example.

$$i\_R1_0 = K1 \times \frac{P_{fc}}{V1}$$

$$i\_R2_0 = (1 - K1) \times \frac{P_{fc}}{V2}$$

Equation 2 wherein, K1 denotes a requirement ratio.

Accordingly, the vehicle controller 190 may be configured to operate the first fuel cell stack (FC1) 111 having a higher voltage to output a higher current, and operate the second fuel cell stack (FC2) 121 having a lower voltage to output a lower current. In other words, the vehicle controller 190 may be configured to adjust the output current of the first fuel cell stack (FC1) 111 and the output current of the second fuel cell stack (FC2) 121 such that the result of following Equation 3 becomes zero. In particular, Moving Average may be applied to Equation 3 to remove noise.

$$\Delta V = \frac{V1 - V2}{2}$$

Equation 3

The vehicle controller 190 may use following Equation 4 to adjust the output current of the first fuel cell stack (FC1) 111 and the output current of the second fuel cell stack (FC2) 121 such that $\Delta V$ approaches zero.

$$K1_n = K1_{n-1} + (\alpha \times \beta)$$

Equation 4 wherein, $\alpha$ and $\beta$ represent control factors, in which $\alpha$ represents a sign and $\beta$ represents an adjustment value.

Figure 3A:
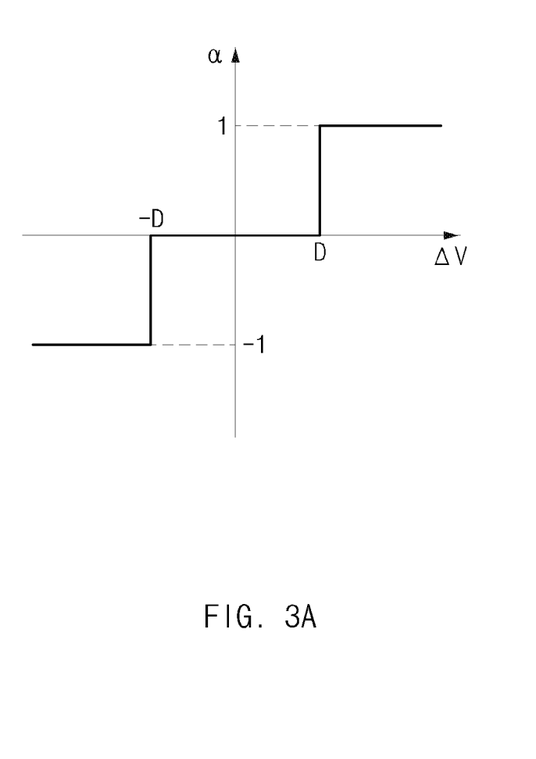
FIGS. 3A and 3B are views illustrating a control factor of a requirement current value, according to an exemplary embodiment of the present disclosure.

As illustrated in FIG. 3A, the sign of '$\alpha$' may be determined like that $\alpha=-1$ if $\Delta V<-D$, $\alpha=0$ is $-D \le \Delta V \le D$, and $\alpha=1$ if $\Delta V > D$. In particular, 'D', which represents a threshold value, may be set as a value between 5 and 10.

Figure 3B:
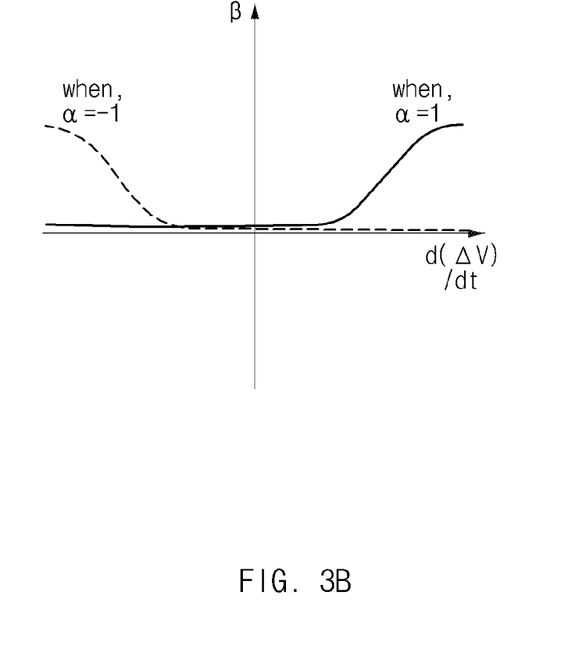

As illustrated in FIG. 3B, '$\beta$' may be determined by the derivative value $$\left(\frac{d(\Delta V)}{dt}\right)$$

of $\Delta V$. In particular, the vehicle controller 190 may be configured to increase the $\beta$ as the derivative value of $\Delta V$ increases in the positive area to adjust the value of K1 to increase, thereby requiring a larger current from the first fuel cell stack 111. In addition, the vehicle controller 190 may be configured to increase the $\beta$ as the derivative value of $\Delta V$ increases in the negative area to adjust the value of K1 to decrease, thereby requiring a smaller current from the first fuel cell stack 111.

Accordingly, since $\Delta V$ becomes greater than D as the difference between V1 and V2 increases, $\alpha=1$ and $\beta>0$ are satisfied, so the value of K1 increases. In other words, i_R1 increases and i_R2 decreases. Alternatively, since $\Delta V$ becomes less than $-D$ as the difference between V1 and V2 decreases, $\alpha=-1$ and $\beta>0$ are satisfied, so the value of K1 decreases. In other words, i_R1 and i_R2 increases.

As illustrated in FIG. 2, the vehicle controller 190 may be configured to adjust the requirement currents from the first fuel cell stack 111 and the second fuel cell stack 121 such that $\Delta V$ approaches zero, that is, V1 becomes equal to V2. Meanwhile, the vehicle controller 190 does not require the first fuel cell stack 111 to output the requirement current value exceeding the maximum available current value (i_max1) of the first fuel cell stack 111, and does not require the second fuel cell stack 121 to output a requirement current value exceeding the maximum available current value i_max2 of the second fuel cell stack 121.

The vehicle controller 190 may be configured to determine the minimum value of i_R1, to which K1 calculated at a previous time point is applied, and i_max1 as the requirement current value for the first fuel cell stack (FC1) 111, and determine the minimum value of i_R2, to which K1 calculated at a previous time point is applied, and i_max2, as the requirement current value of the second fuel cell stack 121, when i_R1>i_max1 or i_R2>i_max2. Although the above description has been made in that two stacks are provided, the present disclosure is not limited to the number of the stacks.

Hereinafter, three fuel cell stacks will be describe in brief. The requirement current value i_R1 from the first fuel cell stack, the requirement current value i_R2 from the second fuel cell stack, and the requirement current value i_R3 from the third fuel cell stack are expressed as illustrated in Equation 5.

$$i\_R1 = K1 \times \frac{P_{fc}}{V1}$$

$$i\_R2 = K2 \times \frac{P_{fc}}{V2}$$

$$i\_R3 = K3 \times \frac{P_{fc}}{V3}$$

Equation 5 wherein, K1, K2, and K3 represent requirement ratios, respectively, have the initial value of ⅓, and satisfies the relationship of K1+K2+K3=1.

In addition, $\Delta V1$, $\Delta V2$, and $\Delta V3$ may be expressed as in Equation 6.

$$\Delta V1 = V1 - (V1 + V2 + V3)/3,$$

$$\Delta V2 = V2 - (V1 + V2 + V3)/3$$

$$\Delta V3 = V3 - (V1 + V2 + V3)/3$$

Equation 6

In addition, K1, K2, and K3 may be expressed as in following Equation 7.

$$K1_n = K1_{n-1} + \alpha 1 \times \beta 1$$

$$K2_n = K2_{n-1} + \alpha 2 \times \beta 2$$

$$K3_n = 1 - K1_n - K2_n$$

Equation 7

Similarly to two fuel cell stacks, $\alpha 1$ and $\beta 1$ may be calculated through the relationship between $\Delta V1$ and $d(\Delta V1)/dt$, and $\alpha 2$ and $\beta 2$ are calculated through the relationship between $\Delta V2$ and $d(\Delta V2)/dt$. In this case, the sign of $\alpha 1$ may be determined like that $\alpha 1=-1$ if $\Delta V1<-D$, $\alpha 1=0$ if $-D \le \Delta V1 \le D$, and $\alpha 1=1$ if $\Delta V1>D$. In particular, D may be set to a threshold value, for example, a value between 5 and 10.

Additionally, β1 may be determined by the derivative value of $$\frac{d(\Delta V1)}{dt}$$

of ΔV1. In other words, the vehicle controller 190 may be configured to increase the β1 as the derivative value of ΔV1 increases in the positive area to adjust the value of K1 to increase, thereby requiring a larger current from the first fuel cell stack 111. The vehicle controller 190 may also be configured to increase the β1 as the derivative value of ΔV1 increases in the negative area to adjust the value of K1 to decrease, thereby requiring a smaller current from the first fuel cell stack 111. Even α2 and β2 may be determined in a manner the same as the above-described manner. Even if three fuel cell stacks are applied, the vehicle controller 190 does not require a current value, which exceeds the maximum available current value, from each fuel cell stack.

Figure 4:
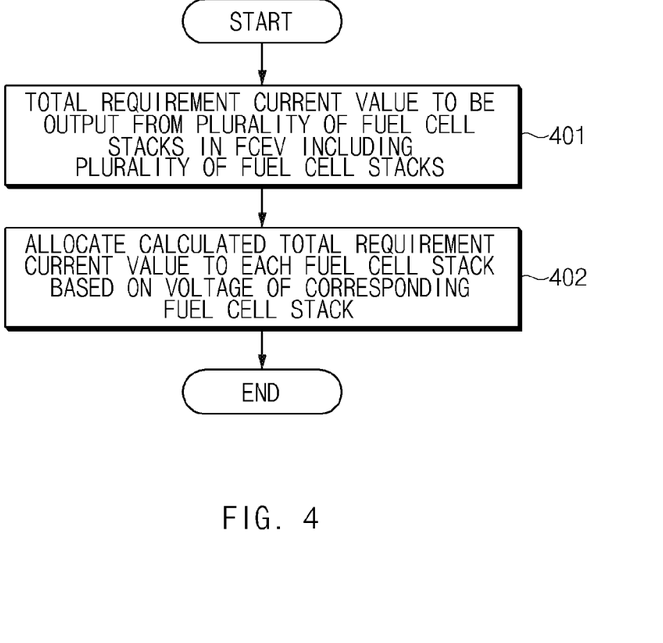
FIG. 4 is a flowchart illustrating a method for controlling the output of a fuel cell stack, according to an exemplary embodiment of the present disclosure.

FIG. 4 is a flowchart illustrating a method for adjusting the output of the fuel cell stack, according to an exemplary embodiment of the present disclosure. First, the vehicle controller 190 may be configured to calculate a total requirement current value to be output from a plurality of fuel cell stacks in a fuel cell electric vehicle (FCEV) including the plurality of fuel cell stacks (401). Thereafter, the vehicle controller 190 may be configured to allocate the calculated total requirement current value to each fuel cell stack based on the voltage of the fuel cell stack (402).

Figure 5:
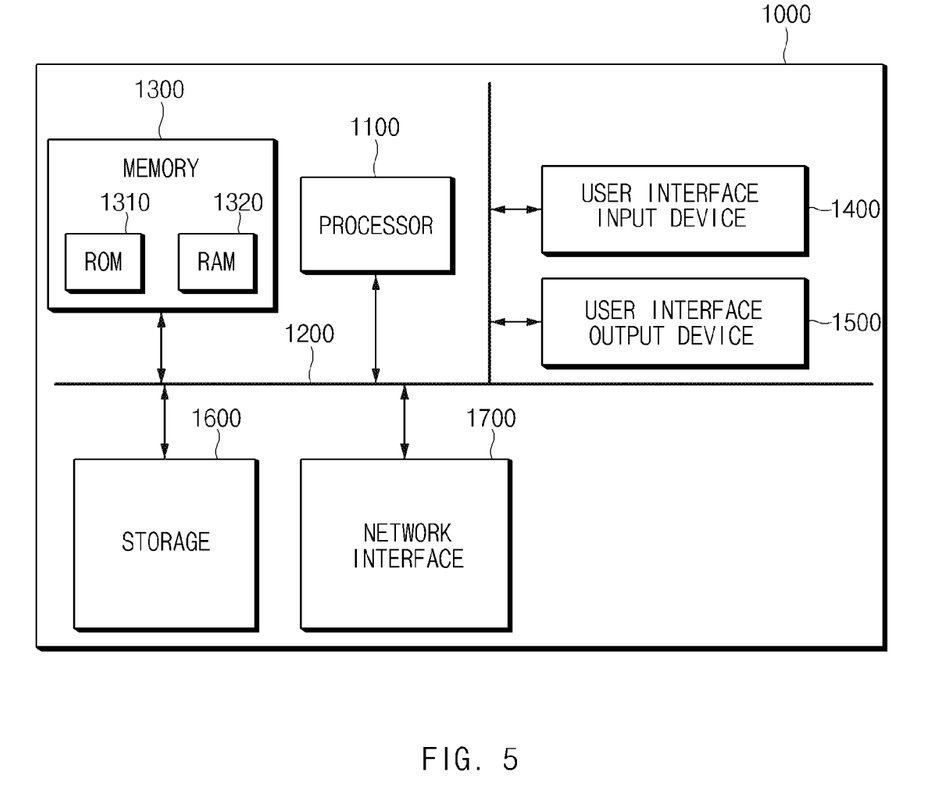
FIG. 5 is a block diagram illustrating a computing system to execute the method for controlling the output of the fuel cell stack, according to an exemplary embodiment of the present disclosure.

FIG. 5 is a block diagram illustrating a computing system to execute the method for controlling or adjusting the output of the fuel cell stack, according to an exemplary embodiment of the present disclosure. Referring to FIG. 5, according to an exemplary embodiment of the present disclosure, the method for controlling the output of the fuel cell stack may be implemented through the computing system. A computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320. Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM memory, a flash memory, a ROM, memory an erasable and programmable ROM (EPROM), an electrically EPROM (EEPROM), a register, a hard disc, a solid state drive (SSD), a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to an exemplary embodiment of the present disclosure, the difference in performance between fuel cell stacks may be prevented from being increased by effectively adjusting the output of a plurality of fuel cell stacks in an FCEV having the plurality of fuel cell stacks.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, exemplary embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. A method for controlling an output of a fuel cell stack, comprising:
   calculating, by a controller, a total requirement current value to be output from a plurality of fuel cell stacks in a fuel cell electric vehicle (FCEV) including the plurality of fuel cell stacks; and
   allocating, by the controller, the calculated total requirement current value to each fuel cell stack based on a voltage of each fuel cell stack,
   wherein the allocating of the calculated total requirement current value to each fuel cell stack includes:
   calculating, by the controller, an allocation ratio of the total requirement current value to be applied to each fuel cell stack; and
   allocating, by the controller, a requirement current value, which corresponds to the calculated allocation ratio, to each fuel cell stack, and
   wherein the calculating of the allocation ratio of the total requirement current value includes:
   calculating, by the controller, the allocation ratio of the total requirement current value such that a difference between voltages of each fuel cell stack is minimized.

2. The method of claim 1, wherein the calculating of the allocation ratio of the total requirement current value is performed periodically.

3. The method of claim 2, wherein the allocating of the requirement current value includes:
   allocating, by the controller, a smaller value of a requirement current value, to which an allocation ratio calculated at a previous time point is applied, and a maximum available current value, to at least one fuel cell stack of the plurality of fuel cell stacks, in response to determining that the requirement current value applied to a corresponding fuel cell stack exceeds the maximum available current value of the corresponding fuel cell stack.

4. The method of claim 1, wherein the allocating of the calculated total requirement current value is performed in response to determining that an output current value of each fuel cell stack exceeds a reference value.

5. A method for controlling an output of a fuel cell stack, comprising:

calculating, by a controller, a total requirement current value to be output from a fuel cell electric vehicle (FCEV) including a first fuel cell stack and a second fuel cell stack;

calculating, by the controller, an allocation ratio of the total requirement current value to minimize a difference between a voltage of the first fuel cell stack and a voltage of the second fuel cell stack; and allocating, by the controller, a requirement current value to each of the first fuel cell stack and the second fuel cell stack depending on the calculated allocation ratio.

6. The method of claim 5, wherein the allocating of the requirement current value includes:

allocating, by the controller, a higher requirement current value to the first fuel cell stack higher than the second fuel cell stack in voltage; and allocating, by the controller, a lower requirement current value to the second fuel cell stack lower than the first fuel cell stack in voltage.

7. The method of claim 5, wherein the calculating of the allocation ratio of the total requirement current value is performed periodically.

8. The method of claim 7, wherein the allocating of the requirement current value includes:

allocating, by the controller, a smaller value of a requirement current value, to which an allocation ratio calculated at a previous time point is applied, and a maximum available current value of each of the first fuel cell stack and the second cell stack, to a corresponding fuel cell stack, in response to determining that the requirement current value applied to the corresponding fuel cell stack exceeds the maximum available current value of the corresponding fuel cell stack.

9. The method of claim 5, wherein the allocating of the requirement current value is performed, in response to determining that an output current value of the first fuel cell stack and an output current value of the second fuel cell stack exceed a reference value.

\* \* \* \* \*